United States Patent
Yang et al.

(10) Patent No.: US 12,027,783 B2
(45) Date of Patent: Jul. 2, 2024

(54) MULTI-LOOP RESONANCE STRUCTURE AND MULTIPLE-INPUT AND MULTIPLE-OUTPUT (MIMO) ANTENNA COMMUNICATION SYSTEM

(71) Applicant: Anhui University, Anhui (CN)

(72) Inventors: Lixia Yang, Hefei (CN); Haoran Yu, Hefei (CN); Aidi Ren, Hefei (CN); Zhanhao Zhang, Hefei (CN)

(73) Assignee: Anhui University, Hefei (CN)

( * ) Notice: Subject to any disclaimer, the term of this patent is extended or adjusted under 35 U.S.C. 154(b) by 321 days.

(21) Appl. No.: 17/686,868

(22) Filed: Mar. 4, 2022

(65) Prior Publication Data

US 2023/0145995 A1  May 11, 2023

(30) Foreign Application Priority Data

Nov. 9, 2021  (CN) .......................... 202111319486.1

(51) Int. Cl.
*H01Q 21/06* (2006.01)
*H01Q 5/371* (2015.01)
*H01Q 7/00* (2006.01)

(52) U.S. Cl.
CPC ............... *H01Q 5/371* (2015.01); *H01Q 7/00* (2013.01); *H01Q 21/065* (2013.01)

(58) Field of Classification Search
CPC ........ H01Q 5/371; H01Q 7/00; H01Q 21/065; H01Q 5/364; H01Q 21/28; H01Q 1/243; H01Q 1/38; H01Q 1/242; Y02D 30/70; H01P 7/08
See application file for complete search history.

(56) References Cited

U.S. PATENT DOCUMENTS

| 8,933,842 | B2* | 1/2015 | Ayatollahi | H01Q 1/243 343/700 MS |
| 9,203,139 | B2* | 12/2015 | Zhu | H01Q 1/243 |
| 11,509,041 | B2* | 11/2022 | Zhang | H01Q 1/243 |

FOREIGN PATENT DOCUMENTS

| CN | 110931964 A | * | 3/2020 | ............. H01Q 1/242 |
| CN | 110112559 B | * | 4/2020 | ............... H01Q 1/38 |

* cited by examiner

*Primary Examiner* — Hai V Tran
*Assistant Examiner* — Michael M Bouizza
(74) *Attorney, Agent, or Firm* — Kirk A. Wilson; Joseph T. Guy; Patent Filing Specialist Inc.

(57) ABSTRACT

A multi-loop resonance structure and a multiple-input and multiple-output (MIMO) antenna communication system. The multi-loop resonance structure includes a metal floor, a first feed branch plate, and a first metal patch, where the metal floor is disposed on a lower surface of the first dielectric substrate, and the metal floor is provided with a resonant-tank set; the first feed branch plate is disposed in parallel on an upper surface of the first dielectric substrate, and a first straight plate in the first feed branch plate is disposed opposite to the resonant-tank set along a substrate line; an end, in the first feed branch plate, far away from the substrate line is connected to the metal floor; and the first metal patch is connected to the metal floor through the first dielectric substrate along a first surface, in the second dielectric substrate, perpendicular to the first dielectric substrate.

20 Claims, 7 Drawing Sheets

MULTI-LOOP RESONANCE STRUCTURE AND MULTIPLE-INPUT AND MULTIPLE-OUTPUT (MIMO) ANTENNA COMMUNICATION SYSTEM

CROSS REFERENCE TO RELATED APPLICATION(S)

This patent application claims the benefit and priority of Chinese Patent Application No. 202111319486.1, filed on Nov. 9, 2021, the disclosure of which is incorporated by reference herein in its entirety as part of the present application.

TECHNICAL FIELD

The present disclosure relates to the field of communications technologies, in particular to a multi-loop resonance structure and a multiple-input and multiple-output (MIMO) antenna communication system.

BACKGROUND ART

With the commercialization of fifth-generation (5G) mobile communication, the demand for high-data-rate communication and wireless services of smart phone has gradually received more attention. At present, China has allocated the Sub-6 GHz frequency band, the 3400-3500 MHz frequency band for China Telecom, the 3500 MHz frequency band for China Unicom, and the 2515-2675 MHz frequency band for China Mobile, and planned 4800-4900 MHz as a range of the operation frequency band of 5G terminals in the future. In the fourth-generation (4G) mobile communication system, mobile communication devices mainly use 2×2 MIMO antenna technology, but the 2×2 MIMO antenna array can no longer meet the requirements of the 5G communication system for channel capacity and rate. 5G mobile terminals usually have a larger number of antenna elements. For example, 8×8 or 10×10 MIMO antenna arrays are designed and applied to achieve greater channel capacity and transmission rate. However, integrating a large number of antenna elements in a terminal device with a limited space reduces the isolation between the antenna elements. In addition, the radiation energy of the antenna elements is more coupled to the adjacent antenna elements, reducing the channel capacity.

According to the current research on 5G communication in various countries, LTE 42 (3.4-3.6 GHz) and LTE 43 (3.6-3.8 GHz) have been certificated and adopted by the European Union; Japan authorized 3.6-4.2 GHz and 4.2-4.9 GHz 5G frequency bands; and a 5150-5875 MHz frequency band is allocated as the operation frequency band of the 5G wireless local area network (WLAN). Therefore, to enable mobile terminal users to obtain services in various regions of the world, it is urgent to deploy broadband antennas covering a plurality of frequency bands on mobile terminals. At present, the main problem in designing the 5G MIMO array antennas is to design broadband MIMO array antennas that can cover the foregoing frequency bands for mobile terminal devices, while ensuring that the antennas have excellent channel capacity and operation performance.

SUMMARY

An objective of the present disclosure is to provide a multi-loop resonance structure and a MIMO antenna communication system. The multi-loop resonance structure is applied to mobile terminal devices, has the characteristics of broadband, high efficiency, low profile, and narrow floor groove, can cover operation frequency bands in global 5G communication, and can be well adapted to the design requirements of mobile terminal devices for being ultra-thin with narrow bezel s.

To implement the above objective, the present disclosure provides the following solutions.

A multi-loop resonance structure is disposed along a first dielectric substrate and a second dielectric substrate that are connected perpendicularly; and the multi-loop resonance structure includes:
a metal floor, a first feed branch plate, and a first metal patch, where
the metal floor is disposed on a lower surface of the first dielectric substrate, and the metal floor is provided with a resonant-tank set;
the first feed branch plate is disposed in parallel on an upper surface of the first dielectric substrate, and a first straight plate in the first feed branch plate is disposed opposite to the resonant-tank set along a substrate line; an end, in the first feed branch plate, far away from the substrate line is connected to the metal floor by using an SMA feed connector; and the substrate line is a connecting line between the first dielectric substrate and the second dielectric substrate; and
the first metal patch is connected to the metal floor through the first dielectric substrate along a first surface, in the second dielectric substrate, perpendicular to the first dielectric substrate, and the first metal patch is disposed opposite to the resonant-tank set.

Optionally, the resonant-tank set specifically includes:
a first resonant tank, a second resonant tank, and a third resonant tank, where
the first resonant tank, the second resonant tank, and the third resonant tank each are of a rectangular structure, two wide sides of the second resonant tank are respectively connected to one wide side of the first resonant tank and one wide side of the third resonant tank;
a length of the wide side of the second resonant tank is greater than a length of the wide side of the first resonant tank;
the length of the wide side of the second resonant tank is greater than a length of the wide side of the third resonant tank;
a long side of the second resonant tank is disposed along the substrate line;
a long side, in the first resonant tank, more far away from the substrate line, a long side, in the second resonant tank, more far away from the substrate line, and a long side, in the third resonant tank, more far away from the substrate line are collinear;
the first straight plate in the first feed branch plate is disposed opposite to the second resonant tank; and
the first metal patch is disposed at projection of the first resonant tank on the substrate line.

Optionally, the multi-loop resonance structure further includes:
a second feed branch plate and a second metal patch, where
the second metal patch is connected to the metal floor through the first dielectric substrate along a first surface of the second dielectric substrate;
the second metal patch is disposed at projection of the third resonant tank on the substrate line;

the second feed branch plate is disposed on a second surface, in the second dielectric substrate, perpendicular to the first dielectric substrate; and the second feed branch plate is connected to the first feed branch plate through a metallized through hole disposed in the second dielectric substrate.

Optionally, the first feed branch plate is of an L-shaped structure; and the second feed branch plate is of a bending-beam-shaped structure that opens downward.

Optionally, the length of the wide side of the first resonant tank is the same as or different from the length of the wide side of the third resonant tank;

a length of wide side of the first straight plate in the first feed branch plate is greater than the length of the wide side of the second resonant tank; and a length of a long side of the first straight plate in the first feed branch plate is smaller than a length of the long side of the second resonant tank.

Optionally, the first metal patch and the second metal patch are both of a rectangular structure;

a length of a long side of the first metal patch is equal to a length of the long side of the first resonant tank; and a length of a long side of the second metal patch is equal to a length of the long side of the third resonant tank.

Optionally, the SMA feed connector specifically includes:

an inner core and an outer core that are disposed coaxially;

the inner core and the outer core are further disposed in the following manner;

the inner core is connected to the one end, in the first feed branch plate, far away from the substrate line; and the outer core is sleeved outside the inner core.

A MIMO antenna communication system includes:

a base and a plurality of foregoing multi-loop resonance structures, where the base specifically includes:

the foregoing first dielectric substrate and four foregoing second dielectric substrates;

long sides of the four second dielectric substrates are perpendicularly connected to the first dielectric substrate along four sides of the first dielectric substrate respectively, to form four substrate lines; and the plurality of multi-loop resonance structures are disposed along the four substrate lines.

Optionally, there are an even quantity of multi-loop resonance structures; and each pair of the plurality of multi-loop resonance structures are arranged symmetrically with a center of the first dielectric substrate as a symmetry center.

Optionally, there are eight multi-loop resonance structures.

Based on specific embodiments provided in the present disclosure, the present disclosure has the following technical effects:

The present disclosure discloses a multi-loop resonance structure and a MIMO antenna communication system. The multi-loop resonance structure is disposed along a first dielectric substrate and a second dielectric substrate that are connected perpendicularly. The multi-loop resonance structure includes a metal floor, a first feed branch plate, and a first metal patch, where the metal patch is disposed on a lower surface of the first dielectric substrate, and the metal floor is provided with a resonant-tank set; the first feed branch plate is disposed in parallel on an upper surface of the first dielectric substrate, and a first straight plate in the first feed branch plate is disposed opposite to the resonant-tank set along a substrate line; an end, in the first feed branch plate, far away from the substrate line is connected to the metal floor by using an SMA feed connector; and the substrate line is a connecting line between the first dielectric substrate and the second dielectric substrate; and the first metal patch is connected to the metal floor through the first metal patch along a first surface, in the second dielectric substrate, perpendicular to the first metal patch, and the first metal patch is disposed opposite to the resonant-tank set. In the present disclosure, the first feed branch plate and the resonant-tank set are disposed to form a first resonant circular loop, which can cover the resonant signal of 5.9 GHz; and the first feed branch plate, the first metal patch, and the resonant-tank set are disposed to form a second resonant circular loop, which can cover the resonant signal of 4.5 GHz. Therefore, the present disclosure, with the characteristics of broadband, high efficiency, low profile, and narrow floor groove, can cover a plurality of operation frequency bands, and can be well adapted to the design requirements of mobile terminal devices for being ultra-thin with narrow bezels.

In addition, the multi-loop resonance structure provided by the present disclosure further includes: a second feed branch plate and a second metal patch, where the second metal patch is connected to the metal floor through the first dielectric substrate along a first surface of the second dielectric substrate; the second metal patch is disposed at projection of the third resonant tank on the substrate line; the second feed branch plate is disposed on a second surface, in the second dielectric substrate, perpendicular to the first dielectric substrate; and the second feed branch plate is connected to the first feed branch plate through a metallized through hole disposed in the second dielectric substrate. In the present disclosure, the first feed branch plate, the first metal patch, the resonant-tank set, the second feed branch plate, and the second metal patch are disposed to form a third resonant circular loop, which can cover the resonant signal of 3.5 GHz, thereby further increasing the range of the operation frequency band of the multi-loop resonance structure.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. Based on the embodiments of the present disclosure, all other embodiments obtained by the person of ordinary skill in the art without creative efforts shall fall within the protection scope of the present disclosure.

An objective of the present disclosure is to provide a multi-loop resonance structure and a MIMO antenna communication system. The multi-loop resonance structure is applied to mobile terminal devices, has the characteristics of broadband, high efficiency, low profile, and narrow floor groove, can cover operation frequency bands in global 5G communication, and can be well adapted to the design requirements of mobile terminal devices for being ultra-thin with narrow bezels.

To make the foregoing objective, features, and advantages of the present disclosure clearer and more comprehensible, the present disclosure is further described in detail below with reference to the accompanying drawings and specific embodiments.

Figure 1:
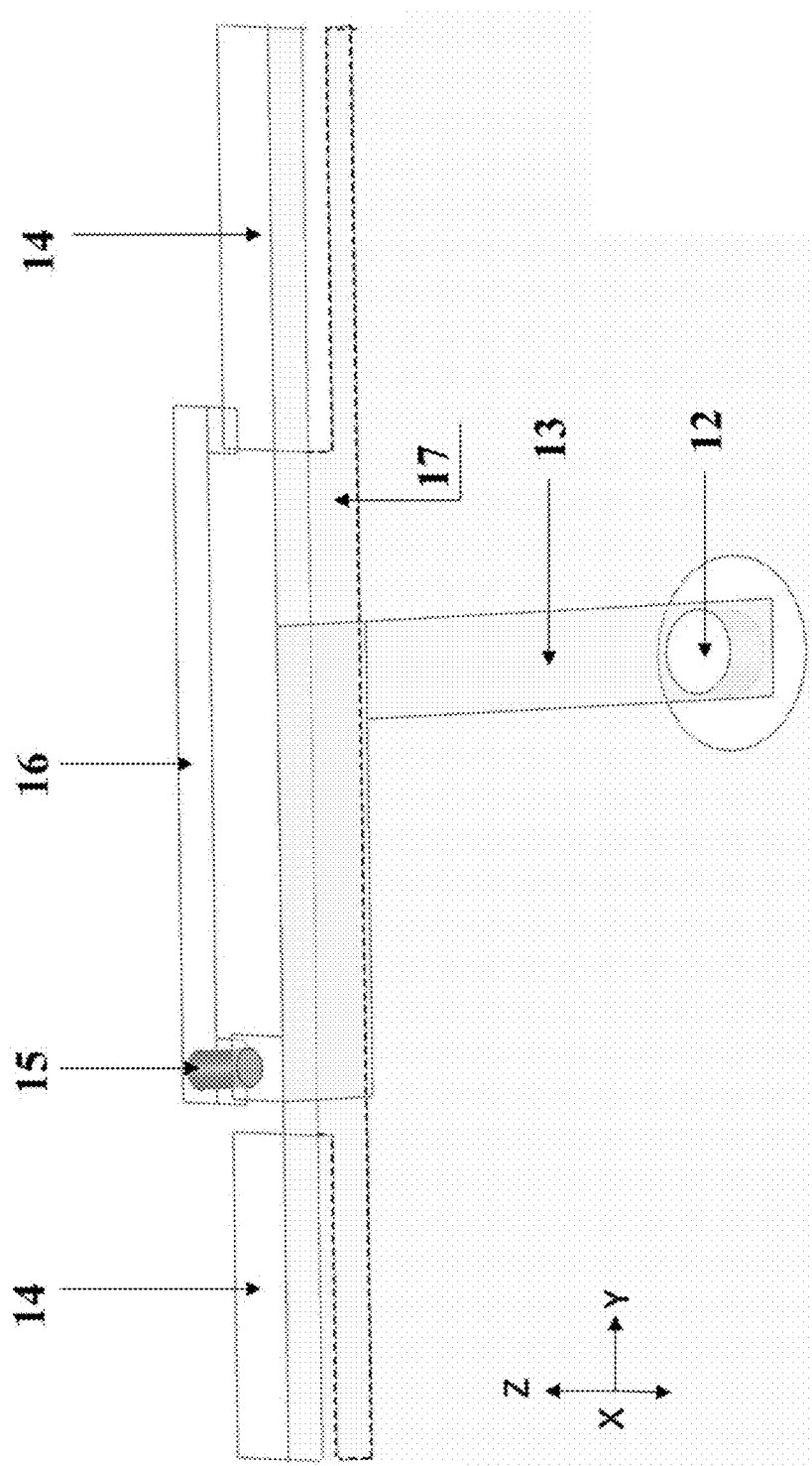
FIG. 1 is a schematic diagram of a multi-loop resonance structure according to an embodiment of the present disclosure.

FIG. 1 is a schematic diagram of a multi-loop resonance structure according to an embodiment of the present disclosure. As shown in FIG. 1, the present disclosure provides the multi-loop resonance structure. The multi-loop resonance structure is disposed along a first dielectric substrate and a second dielectric substrate that are connected perpendicularly; and the multi-loop resonance structure includes:
a metal floor, a first feed branch plate, and a first metal patch, where
the metal floor is disposed on a lower surface of the first dielectric substrate, and the metal floor is provided with a resonant-tank set;
the first feed branch plate is disposed in parallel on an upper surface of the first dielectric substrate, and a first straight plate in the first feed branch plate is disposed opposite to the resonant-tank set along a substrate line; an end, in the first feed branch plate, far away from the substrate line is connected to the metal floor by using an SMA feed connector; and the substrate line is a connecting line between the first dielectric substrate and the second dielectric substrate; and
the first metal patch is connected to the metal floor through the first dielectric substrate along a first surface, in the second dielectric substrate, perpendicular to the first dielectric substrate, and the first metal patch is disposed opposite to the resonant-tank set.

The resonant-tank set specifically includes:
a first resonant tank, a second resonant tank, and a third resonant tank, where
the first resonant tank, the second resonant tank, and the third resonant tank each are of a rectangular structure, two wide sides of the second resonant tank are respectively connected to one wide side of the first resonant tank and one wide side of the third resonant tank;
a length of the wide side of the second resonant tank is greater than a length of the wide side of the first resonant tank;
the length of the wide side of the second resonant tank is greater than a length of the wide side of the third resonant tank;
a long side of the second resonant tank is disposed along the substrate line;
a long side, in the first resonant tank, more far away from the substrate line, a long side, in the second resonant tank, more far away from the substrate line, and a long side, in the third resonant tank, more far away from the substrate line are collinear;
the first straight plate in the first feed branch plate is disposed opposite to the second resonant tank; and
the first metal patch is disposed at projection of the first resonant tank on the substrate line.

In addition, the multi-loop resonance structure further includes:
a second feed branch plate and a second metal patch, where
the second metal patch is connected to the metal floor through the first dielectric substrate along a first surface of the second dielectric substrate;
the second metal patch is disposed at projection of the third resonant tank on the substrate line;
the second feed branch plate is disposed on a second surface, in the second dielectric substrate, perpendicular to the first dielectric substrate; and
the second feed branch plate is connected to the first feed branch plate through a metallized through hole disposed in the second dielectric substrate.

Preferably,
the first feed branch plate is of an L-shaped structure; and
the second feed branch plate is of a bending-beam-shaped structure that opens downward.

Preferably,
the length of the wide side of the first resonant tank is the same as or different from the length of the wide side of the third resonant tank;
a length of wide side of the first straight plate in the first feed branch plate is greater than the length of the wide side of the second resonant tank; and
a length of a long side of the first straight plate in the first feed branch plate is smaller than a length of the long side of the second resonant tank.

Specifically,
the first metal patch and the second metal patch are both of a rectangular structure;
a length of a long side of the first metal patch is equal to a length of the long side of the first resonant tank; and
a length of a long side of the second metal patch is equal to a length of the long side of the third resonant tank.

In the present disclosure, the SMA feed connector specifically includes:
an inner core and an outer core that are disposed coaxially;
the inner core and the outer core are further disposed in the following manner;

the inner core is connected to the one end, in the first feed branch plate, far away from the substrate line; and the outer core is sleeved outside the inner core.

Figure 2:
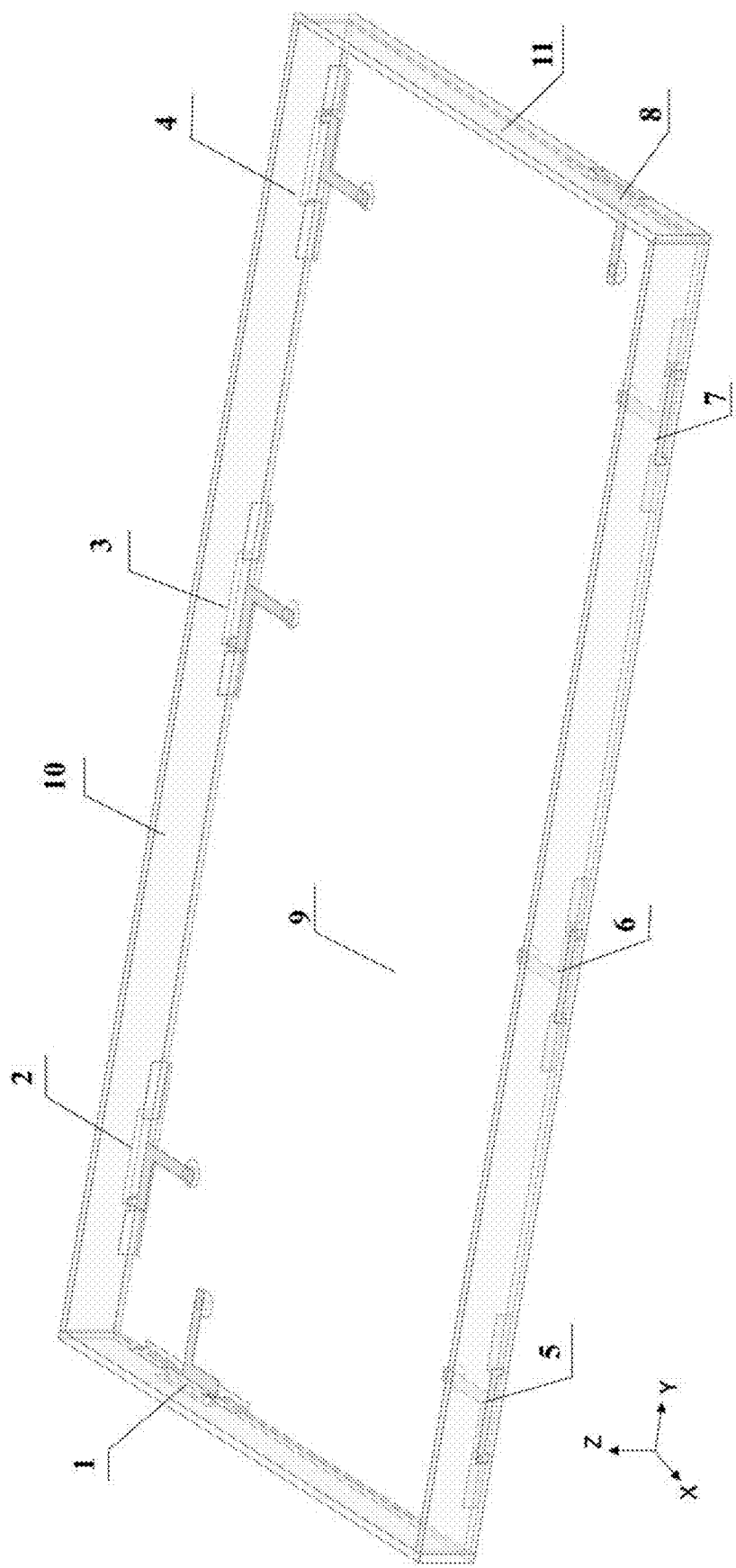
FIG. 2 is a schematic diagram of a three-dimensional structure of a MIMO antenna communication system according to an embodiment of the present disclosure.
Figure 3:
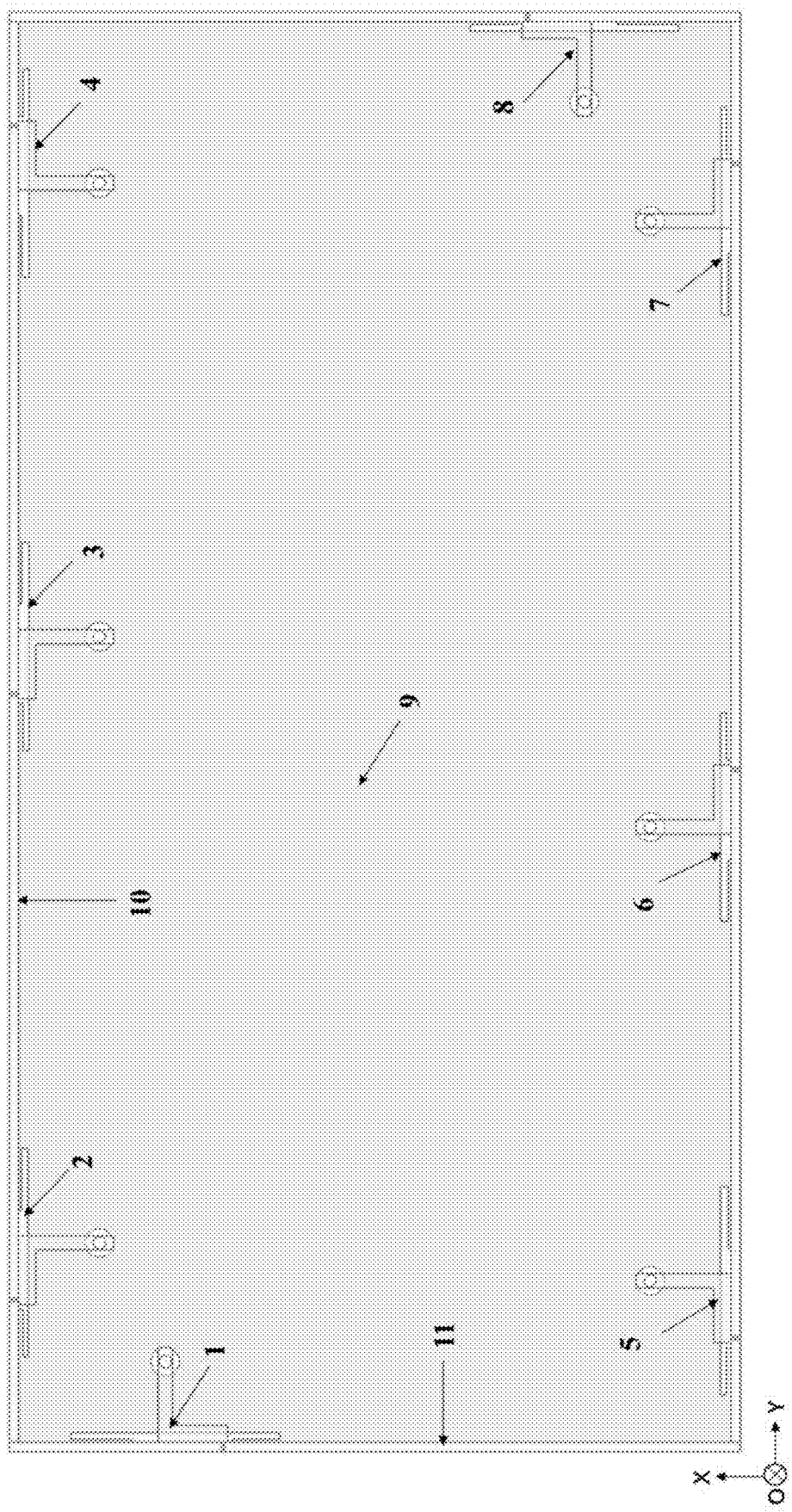
FIG. 3 is a top view of the MIMO antenna communication system according to an embodiment of the present disclosure.
Figure 4:
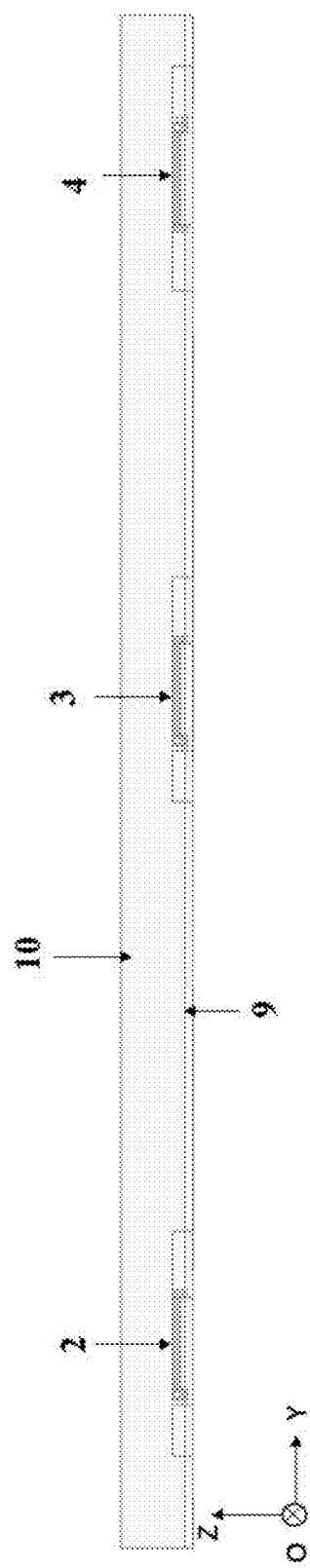
FIG. 4 is a front view of the MIMO antenna communication system according to an embodiment of the present disclosure.

FIG. 2 is a schematic diagram of a three-dimensional structure of a MIMO antenna communication system according to an embodiment of the present disclosure; FIG. 3 is a top view of the MIMO antenna communication system according to an embodiment of the present disclosure; and FIG. 4 is a front view of the MIMO antenna communication system according to an embodiment of the present disclosure. As shown in FIG. 2 to FIG. 4, the present disclosure further provides the MIMO antenna communication system, including:

a base and a plurality of foregoing multi-loop resonance structures.

The base specifically includes:

the foregoing first dielectric substrate and four foregoing second dielectric substrates;

long sides of the four second dielectric substrates are perpendicularly connected to the first dielectric substrate along four sides of the first dielectric substrate respectively, to form four substrate lines; and the plurality of multi-loop resonance structures are disposed along the four substrate lines.

There are an even quantity of multi-loop resonance structures;

each pair of the plurality of multi-loop resonance structures are arranged symmetrically with a center of the first dielectric substrate as a symmetry center.

Specifically, there are eight multi-loop resonance structures.

Specifically, as shown in FIG. 1 to FIG. 4, 1 represents an antenna 1; 2 represents an antenna 2; 3 represents an antenna 3; 4 represents an antenna 4; 5 represents an antenna 5; 6 represents an antenna 6; 7 represents an antenna 7; 8 represents an antenna 8; 9 represents a first dielectric substrate; 10 represents a second dielectric substrate 1; 11 represents a second dielectric substrate 2; 12 represents an SMA feed structure; 13 represents a L-shaped feed branch; 14 represents metal patches on an inner surface of a side dielectric substrate; 15 represents a metalized through hole; 16 represents an inverted U-shaped metal branch on an outer surface of the side dielectric substrate; and 17 represents a T-shaped groove. The broadband 5G MIMO antenna array structure with orthogonal polarization characteristics provided by the present disclosure includes: dielectric substrates, an SMA feed structure, a L-shaped coupling feed branch, a metalized through hole, a T-shaped groove structure, and metal radiating branches. The dielectric substrates include a horizontal dielectric substrate and side dielectric substrates. The first dielectric substrate is the horizontal dielectric substrate. The second dielectric substrates are the side dielectric substrates. Antenna elements are on the first dielectric substrate, and a metal floor is below the first dielectric substrate. The second dielectric substrate 1 and the second dielectric substrate 2 are placed perpendicularly to simulate the bezel of a smart phone.

A coaxial line is used in the antenna structure to feed the antenna elements on the dielectric substrate. The inner core of the coaxial line is connected to the L-shaped feed branch on the upper surface of the horizontal dielectric substrate, and the outer core of the coaxial line is connected to the metal floor below the horizontal dielectric substrate to feed the antennas.

The L-shaped coupling feed branch is on the horizontal dielectric substrate. A tail end of the feed branch is connected to the inner core of the coaxial line, and the other end is connected to the metallized through hole.

The metallized through hole is located in the side dielectric substrates, to connect the L-shaped feed branch on the horizontal dielectric substrate to the metal branch on the outer surface of the side dielectric substrate. Such a practice, compared with a case that the metal branch on the outer surface of the side dielectric substrate is not connected, extends the effective electrical length of the feeder, while adjusting the impedance matching of the antennas, so that it and the groove on the right side of the metal floor form a complete circular current distribution, to excite the low frequency (3.5 GHz) resonance.

The T-shaped groove structure is located below the first dielectric substrate. The left end of the T-shaped groove is used as a part of a circular current distribution during the intermediate frequency (4.8 GHz) resonance, and the right end is used as a part of the circular current distribution during the low frequency (3.5 GHz) resonance. The current distributions of intermediate frequency and low frequency resonances form this complementary distribution characteristic as a whole.

The metal radiating branches include the metal patches on the inner surfaces of the first dielectric substrate and the second dielectric substrates as well as the inverted U-shaped metal branches of their outer surfaces. The metal patches on the inner surfaces of the side dielectric substrates are placed vertically along both edges of the T-shaped groove. The metal patches are 6-8 mm long and 1.5-2 mm high, to adjust the impedance matching of the antennas.

The inverted U-shaped metal branches on the outer surfaces are connected through the metalized through hole and extend in a direction between the metal patches on two inner surfaces, to extend the effective electrical length of the feeder and adjust the impedance matching of the antennas. The extension end of the U-shaped branch is not connected to the metal patches on the inner surface. The antenna elements are fed through coupling, to reduce the complexity of the antenna structure.

The spatial dimension of the broadband 5G MIMO antenna structure is 22 mm long, 10 mm wide, and 2 mm high.

The first dielectric substrate and the second dielectric substrate are 0.8 mm and 1 mm thin respectively. The first dielectric substrate is 150 mm long and 75 mm wide. The second dielectric substrate 1 and the second dielectric substrate 2 are 150 mm and 77 mm long and are 7 mm high. The SMA feed structure is 0.8 mm high. The dielectric substrates are all rectangular, the material is FR4_epoxy, the dielectric constant is εr=4.4, and the loss angle of the dielectric substrates is tan δ=0.02.

The spatial rectangular coordinate system o-xyz includes: the origin o, the x-axis, the y-axis, and the z-axis.

The first dielectric substrate is parallel to the xoy surface of the spatial rectangular coordinate system o-xyz. The second dielectric substrate 1 and the second dielectric substrate 2 are respectively parallel to the xoz surface and the yoz surface of the spatial rectangular coordinate system o-xyz.

The structure of the antenna elements is characterized by the metal floor printed on the lower surface of the horizontal dielectric substrate. The T-shaped groove is printed on the metal floor. The L-shaped feed branch is connected to the metal branches on the outer surfaces of the side dielectric substrates through the metallized through hole, to extend the effective electrical length of the feeder and adjust the impedance matching of the antennas, so that it and the groove on the right side of the metal floor form a complete circular current distribution, to excite the low frequency (3.5 GHz) resonance of the antennas. Similarly, the left end of the T-shaped groove is used as a part of the circular current distribution during the intermediate frequency (4.8 GHz) resonance. The current distributions of intermediate frequency and low frequency resonances form this complementary distribution characteristic as a whole. In addition, the high frequency (5.9 GHz) resonance is a typical groove mode, and the current is distributed around the T-shaped groove. The operation bandwidths of the three resonances are combined together to cover the resonance frequency band of 3.3-6 GHz.

The eight element MIMO array antennas are placed along long and short sides. The eight element antennas are placed on the first dielectric substrate, and the antennas 2, 3, and 4 are placed along the second dielectric substrate. The distance between the antenna 2 and the antenna 3 is 37-45 mm. The distance between the antenna 3 and the antenna 4 is 25-30 mm. The antennas 5, 6, and 7 are placed on the other side of the dielectric substrate, and are symmetrical with the antennas 2, 3, 4 about the origin of the coordinates. The antennas 1 and 8 are placed along the second dielectric substrate 2 and are symmetrical about the origin o of the coordinates. The distances between the antennas 1 and 8 and the bezel are 4-8 mm.

In the eight element antenna system, the specific arrangement directions of the antenna elements are as follows: the antenna 2 and the antenna 3 are placed along the coordinate system-y axis. The antenna 6 and the antenna 7 are placed along the coordinate system +y axis. The antenna 3 and the antenna 4 are placed in opposite directions. The antenna 5 and antenna 6 are placed in opposite directions. The antenna 1 is placed along the coordinate system −x axis. The antenna 8 is placed along the coordinate system +x axis.

The T-shaped groove 17 is located on the metal floor below the first dielectric substrate, and is 20-23 mm long and 0.8-1.5 mm wide. The left part of the T-shaped groove is 4.5-5.5 mm long, and the right part of the groove is 6-7 mm long and is 0.3-0.6 mm wide. When the antennas are fed, the current passes through the right and left parts of the groove respectively to excite low-frequency and intermediate-frequency resonances.

The metalized through hole 15 is connected to the L-shaped feed branch 13 and the inverted U-shaped metal branch 16 on the outer surface respectively. The metalized through hole is 1-2 mm high, and the diameter thereof is 0.2-0.5 mm.

The inverted U-shaped metal branch 16 on the outer surface is 10-11 mm long and 0.5-1 mm wide. The vertical branches on the left and right sides of the metal branch extend the low-frequency current paths and effectively broaden the low-frequency bandwidth.

The metal patches 14 on the inner surfaces are placed vertically along both sides of the T-shaped groove 17, and are connected to the metal floor. The metal patches are 5-7 mm long and 1.5-2.5 mm high, to reduce the input impedance and adjust the impedance matching of the antennas.

Figure 5:
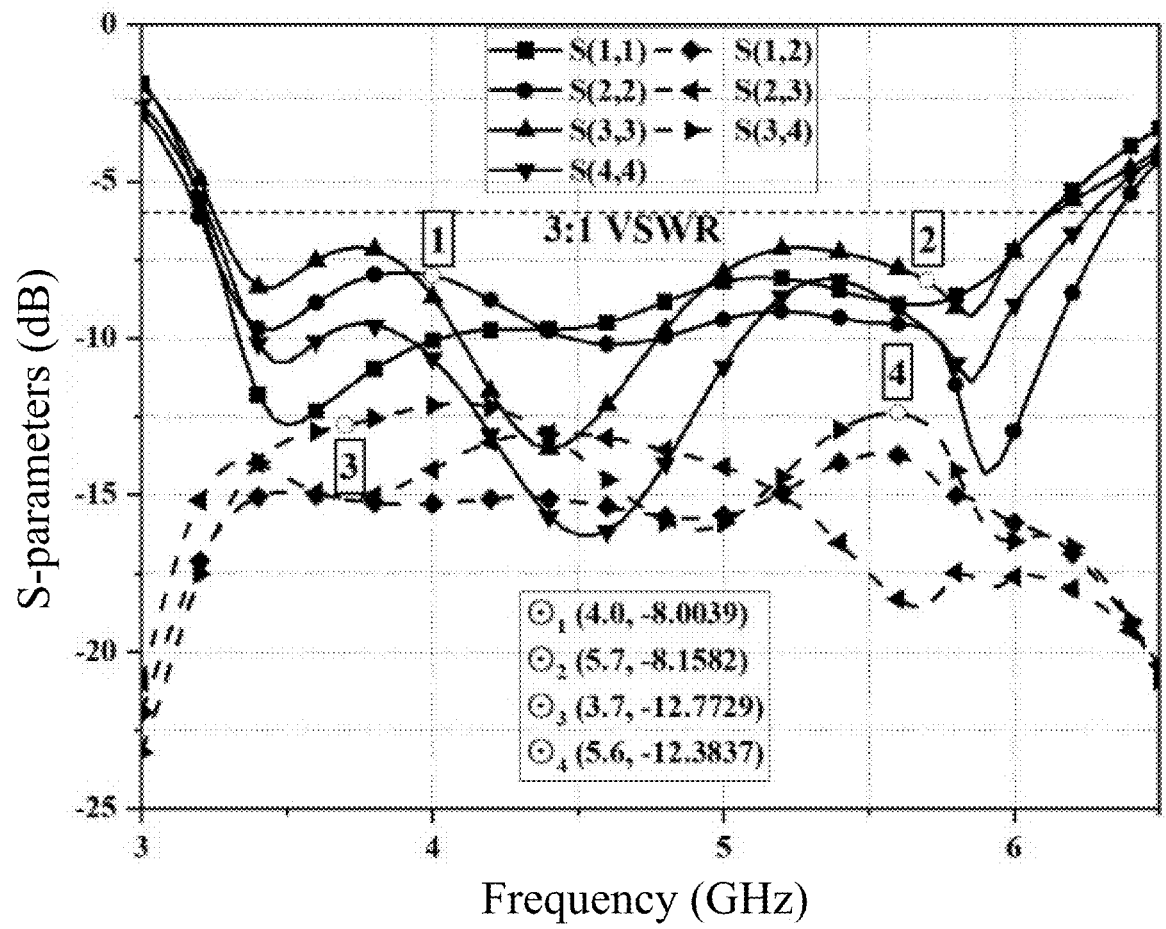
FIG. 5 is a curve diagram of S parameters of antennas 1 to 4 in broadband MIMO array antennas used for 5G smart phones according to an embodiment of the present disclosure.

As shown in FIG. 5, the antenna 1, with a distance of 10-15 mm from the edge of the bezel, is placed along a third side dielectric substrate. The antenna 2, with a distance of 8-15 mm from the edge of the bezel, is placed along the second dielectric substrate. The orthogonal arrangement of the antenna 1 and the antenna 2 makes polarization directions of the antennas are orthogonal to each other. Such an antenna pair with orthogonal polarization has high isolation. Such an arrangement makes the adjacent distance between the antenna 2 and the antenna 4 placed along the first dielectric substrate larger, thereby further improving the isolation of the antenna array.

The antennas 1-4 and the antennas 5-8 in the eight element MIMO array antennas are symmetrical about the coordinate origin o, so that the antennas 5-8 have S parameters and performance similar to those of the antennas 1-4.

In the ultra-broadband 5G MIMO array antenna structure, the low-frequency resonance point of 3.5 GHz is generated by a circular current path formed by the L-shaped feed branch 13, the metalized through hole 15, the inverted U-shaped metal branch 16 on the outer surface, the metal patch 14 on the right side on the inner surface, and the right part of the T-shaped groove 17. The intermediate frequency resonance point of 4.5 GHz is generated by the circular current path formed by the L-shaped feed branch 13, the metal patch 14 on the left side on the inner surface, and the left part of the T-shaped groove 17. The high frequency resonance point of 5.9 GHz is generated by the circular current path formed by the L-shaped feed branch 13 and the T-shaped groove 17. The operation bandwidths of the three resonances are combined together to cover the resonance frequency band of 3.3-6 GHz.

Figure 6:
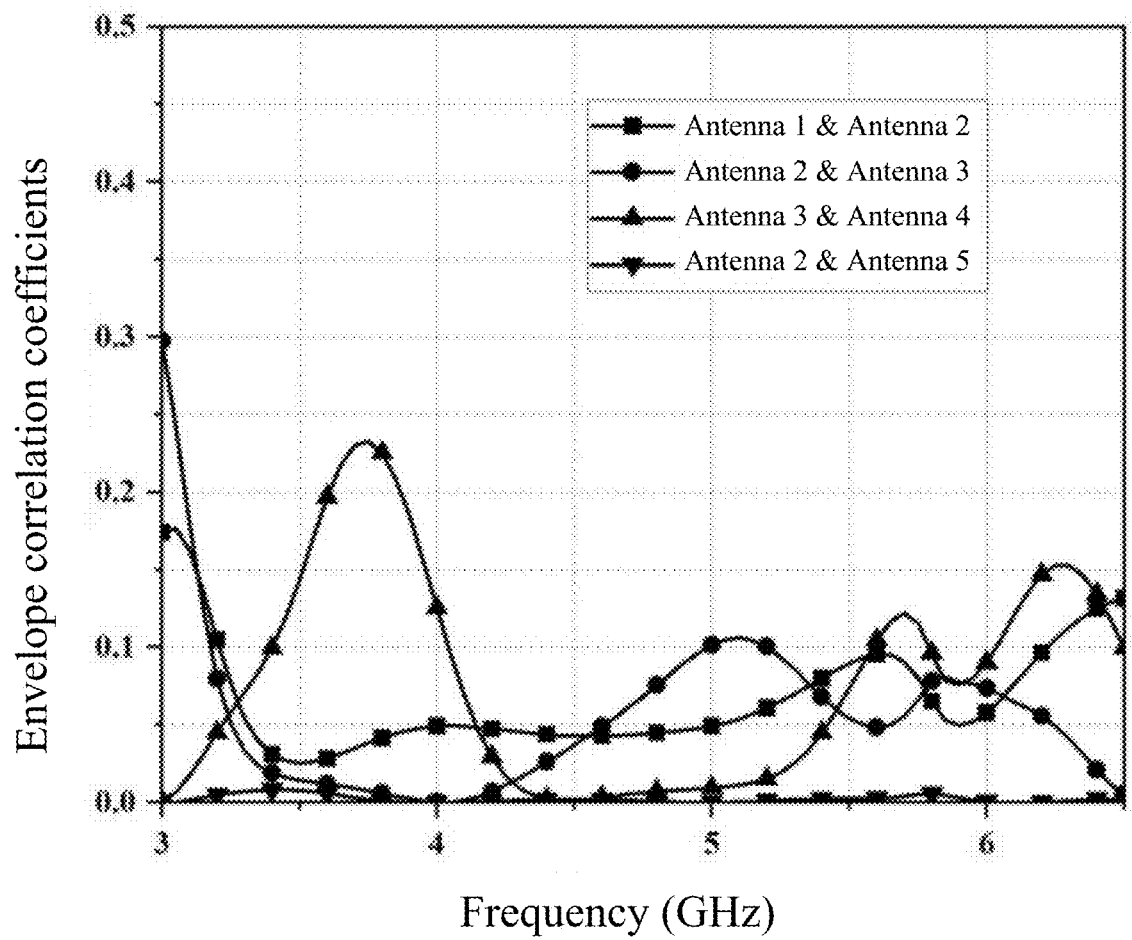
FIG. 6 is a curve diagram of envelope correlation coefficients (ECCs) of adjacent elements of antennas 1 to 5 in the broadband MIMO array antennas used for 5G smart phones according to an embodiment of the present disclosure.
Figure 7:
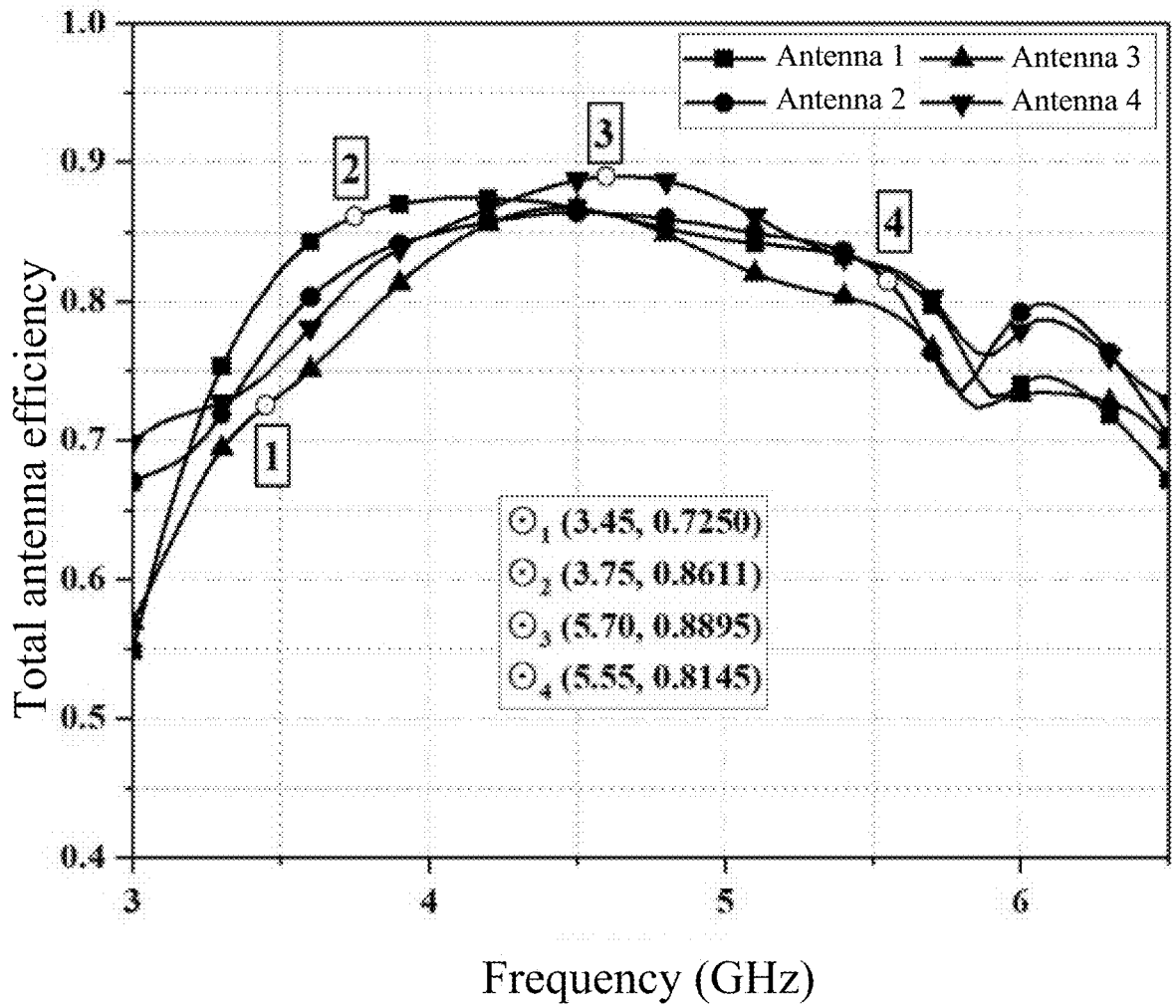
FIG. 7 is a curve diagram of effective radiation efficiencies of the antennas 1 to 4 in the broadband MIMO array antennas used for 5G smart phones according to an embodiment of the present disclosure.

Specifically, as shown in FIG. 5, the operation frequency bands of the antennas 1-4 cover 3.3-6 GHz, and the isolations between adjacent antenna elements are also higher than 12 dB. As shown in FIG. 6, the ECCs between the antenna elements are lower than 0.25, which are lower than the operation standard of the MIMO antenna system, that is, the ECC is less than 0.5. As shown in FIG. 7, the radiation efficiencies of the antennas 1-4 are higher than 70% in 3.3-6 GHz, which are far higher than the operation standard of the MIMO antenna system, that is, the radiation efficiency is greater than 40%.

The present disclosure may have the following advantages:

1. The L-shaped feed structure is connected to the metal branches on the side substrate through the metallized through hole, to extend the effective electrical length of the feeder, adjust the impedance matching of the antennas at the low frequency, and excite the low frequency resonance. The current distributions of the intermediate frequency and low frequency resonances form this complementary distribution characteristic as a whole. The two complementary circular resonance modes and the bandwidth excited by the high-frequency groove mode are combined together to cover the 3.3-6 GHz broadband.

2. The T-shaped groove on the metal floor is only 1 mm wide, and can be adapted to the trend and requirement of the smart phone for a narrow bezel in the future.

3. The resonant paths formed by metal radiating branches and floor current are used, and the profile heights of the antennas are relatively low, reaching 2 mm, which can be well applied to ultra-thin mobile terminals in the future.

4. The arrangement with orthogonal polarization characteristics is used. The antenna 1 and the antenna 8 are respectively placed along the short bezels on both sides, and the antennas 2 to 7 are placed respectively along the long bezels on both sides, so that the MIMO antenna array obtains relatively high isolations without any decoupling structure.

In summary, the broadband MIMO array antennas for future 5G smart phones provided by the present disclosure can be suitable for mobile terminal communication, and can effectively cover the 5G mobile communication frequency band under 6 GHz. Various performance parameters can meet the operation standards of the MIMO antenna system.

So that when in each frequency band, the antennas have better isolation and radiation efficiency. In addition, the metal radiating branches and the floor current are used to form circular current paths. Compared with the circular antenna formed by bending and folding the metal branches on the side substrates, this antenna structure has characteristic of broadband, high isolation, high efficiency, low profile, and narrow floor groove, so that this design is well suitable for the requirement of mobile terminals for being ultra-thin with narrow bezels in the future, and can cover the operation frequency bands of n77, n78, n79 and 5G WLAN in global 5G communication.

Each embodiment of this specification is described in a progressive manner, each embodiment focuses on the difference from other embodiments, and the same and similar parts between the embodiments may refer to each other. The system disclosed in the embodiments corresponds to the method disclosed in the embodiments. Therefore, the system is described in a relatively simple manner. For the related parts, reference may be made to the description of the method parts.

In this specification, several specific embodiments are used for illustration of the principles and implementations of the present disclosure. The description of the foregoing embodiments is used to help illustrate the method of the present disclosure and the core ideas thereof. In addition, persons of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A multi-loop resonance structure, wherein the multi-loop resonance structure is disposed along a first dielectric substrate and a second dielectric substrate that are connected perpendicularly; and
the multi-loop resonance structure comprises:
a metal floor, a first feed branch plate, and a first metal patch, wherein
the metal floor is disposed on a lower surface of the first dielectric substrate, and the metal floor is provided with a resonant-tank set;
the first feed branch plate is disposed in parallel on an upper surface of the first dielectric substrate, and a first straight plate in the first feed branch plate is disposed opposite to the resonant-tank set along a substrate line;
an end, in the first feed branch plate, far away from the substrate line is connected to the metal floor by using an SMA feed connector; and the substrate line is a connecting line between the first dielectric substrate and the second dielectric substrate; and
the first metal patch is connected to the metal floor through the first dielectric substrate along a first surface, in the second dielectric substrate, perpendicular to the first dielectric substrate, and the first metal patch is disposed opposite to the resonant-tank set.

2. The multi-loop resonance structure according to claim 1, wherein the resonant-tank set specifically comprises:
a first resonant tank, a second resonant tank, and a third resonant tank, wherein
the first resonant tank, the second resonant tank, and the third resonant tank each are of a rectangular structure, two wide sides of the second resonant tank are respectively connected to one wide side of the first resonant tank and one wide side of the third resonant tank;
a length of the wide side of the second resonant tank is greater than a length of the wide side of the first resonant tank;
the length of the wide side of the second resonant tank is greater than a length of the wide side of the third resonant tank;
a long side of the second resonant tank is disposed along the substrate line;
a long side, in the first resonant tank, more far away from the substrate line, a long side, in the second resonant tank, more far away from the substrate line, and a long side, in the third resonant tank, more far away from the substrate line are collinear;
the first straight plate in the first feed branch plate is disposed opposite to the second resonant tank; and
the first metal patch is disposed at projection of the first resonant tank on the substrate line.

3. The multi-loop resonance structure according to claim 2, further comprising:
a second feed branch plate and a second metal patch, wherein
the second metal patch is connected to the metal floor through the first dielectric substrate along a first surface of the second dielectric substrate;
the second metal patch is disposed at projection of the third resonant tank on the substrate line;
the second feed branch plate is disposed on a second surface, in the second dielectric substrate, perpendicular to the first dielectric substrate; and
the second feed branch plate is connected to the first feed branch plate through a metallized through hole disposed in the second dielectric substrate.

4. The multi-loop resonance structure according to claim 3, wherein
the first feed branch plate is of an L-shaped structure; and
the second feed branch plate is of a bending-beam-shaped structure that opens downward.

5. The multi-loop resonance structure according to claim 3, wherein
the first metal patch and the second metal patch are both of a rectangular structure;
a length of a long side of the first metal patch is equal to a length of the long side of the first resonant tank; and
a length of a long side of the second metal patch is equal to a length of the long side of the third resonant tank.

6. The multi-loop resonance structure according to claim 2, wherein
the length of the wide side of the first resonant tank is the same as or different from the length of the wide side of the third resonant tank;
a length of a wide side of the first straight plate in the first feed branch plate is greater than the length of the wide side of the second resonant tank; and
a length of a long side of the first straight plate in the first feed branch plate is smaller than a length of the long side of the second resonant tank.

7. The multi-loop resonance structure according to claim 1, wherein the SMA feed connector specifically comprises:
an inner core and an outer core that are disposed coaxially;
the inner core and the outer core are further disposed in the following manner;
the inner core is connected to the one end, in the first feed branch plate, far away from the substrate line; and
the outer core is sleeved outside the inner core.

8. A multiple-input and multiple-output (MIMO) antenna communication system, comprising:

a base and a plurality of multi-loop resonance structures according to claim 1, wherein the base specifically comprises:
the first dielectric substrate and four second dielectric substrates;
long sides of the four second dielectric substrates are perpendicularly connected to the first dielectric substrate along four sides of the first dielectric substrate respectively, to form four substrate lines; and
the plurality of multi-loop resonance structures are disposed along the four substrate lines.

9. The MIMO antenna communication system according to claim 8, wherein the resonant-tank set specifically comprises:
a first resonant tank, a second resonant tank, and a third resonant tank, wherein
the first resonant tank, the second resonant tank, and the third resonant tank each are of a rectangular structure, two wide sides of the second resonant tank are respectively connected to one wide side of the first resonant tank and one wide side of the third resonant tank;
a length of the wide side of the second resonant tank is greater than a length of the wide side of the first resonant tank;
the length of the wide side of the second resonant tank is greater than a length of the wide side of the third resonant tank;
a long side of the second resonant tank is disposed along the substrate line;
a long side, in the first resonant tank, more far away from the substrate line, a long side, in the second resonant tank, more far away from the substrate line, and a long side, in the third resonant tank, more far away from the substrate line are collinear;
the first straight plate in the first feed branch plate is disposed opposite to the second resonant tank; and
the first metal patch is disposed at projection of the first resonant tank on the substrate line.

10. The MIMO antenna communication system according to claim 9, further comprising:
a second feed branch plate and a second metal patch, wherein
the second metal patch is connected to the metal floor through the first dielectric substrate along a first surface of the second dielectric substrate;
the second metal patch is disposed at projection of the third resonant tank on the substrate line;
the second feed branch plate is disposed on a second surface, in the second dielectric substrate, perpendicular to the first dielectric substrate; and
the second feed branch plate is connected to the first feed branch plate through a metallized through hole disposed in the second dielectric substrate.

11. The MIMO antenna communication system according to claim 10, wherein
the first feed branch plate is of an L-shaped structure; and
the second feed branch plate is of a bending-beam-shaped structure that opens downward.

12. The MIMO antenna communication system according to claim 11, wherein there are an even quantity of multi-loop resonance structures; and
each pair of the plurality of multi-loop resonance structures are arranged symmetrically with a center of the first dielectric substrate as a symmetry center.

13. The MIMO antenna communication system according to claim 10, wherein there are an even quantity of multi-loop resonance structures; and
each pair of the plurality of multi-loop resonance structures are arranged symmetrically with a center of the first dielectric substrate as a symmetry center.

14. The MIMO antenna communication system according to claim 9, wherein
the length of the wide side of the first resonant tank is the same as or different from the length of the wide side of the third resonant tank;
a length of a wide side of the first straight plate in the first feed branch plate is greater than the length of the wide side of the second resonant tank; and
a length of a long side of the first straight plate in the first feed branch plate is smaller than a length of the long side of the second resonant tank.

15. The MIMO antenna communication system according to claim 14, wherein there are an even quantity of multi-loop resonance structures; and
each pair of the plurality of multi-loop resonance structures are arranged symmetrically with a center of the first dielectric substrate as a symmetry center.

16. The MIMO antenna communication system according to claim 10, wherein
the first metal patch and the second metal patch are both of a rectangular structure;
a length of a long side of the first metal patch is equal to a length of the long side of the first resonant tank; and
a length of a long side of the second metal patch is equal to a length of the long side of the third resonant tank.

17. The MIMO antenna communication system according to claim 9, wherein there are an even quantity of multi-loop resonance structures; and
each pair of the plurality of multi-loop resonance structures are arranged symmetrically with a center of the first dielectric substrate as a symmetry center.

18. The MIMO antenna communication system according to claim 8, wherein the SMA feed connector specifically comprises:
an inner core and an outer core that are disposed coaxially;
the inner core and the outer core are further disposed in the following manner;
the inner core is connected to the one end, in the first feed branch plate, far away from the substrate line; and
the outer core is sleeved outside the inner core.

19. The MIMO antenna communication system according to claim 8, wherein there are an even quantity of multi-loop resonance structures; and
each pair of the plurality of multi-loop resonance structures are arranged symmetrically with a center of the first dielectric substrate as a symmetry center.

20. The MIMO antenna communication system according to claim 19, wherein there are eight multi-loop resonance structures.

* * * * *